Figure 1:
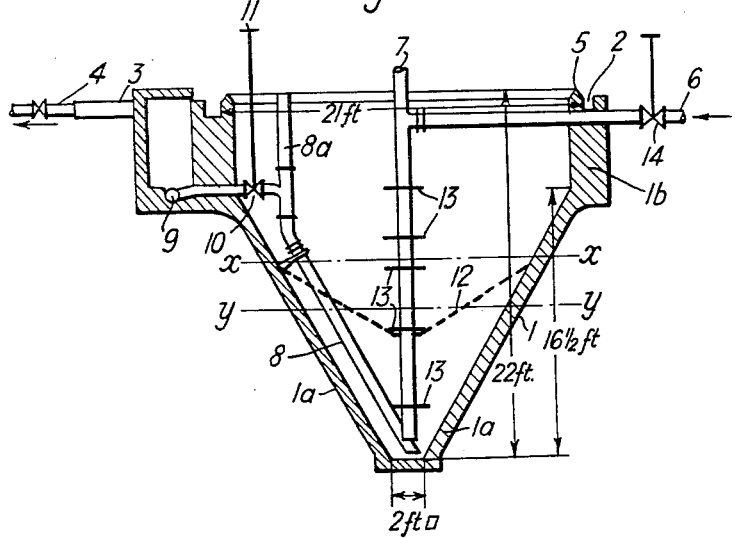

United States Patent Office 2,938,867
Patented May 31, 1960

2,938,867

METHOD OF PURIFICATION OF SEWAGE AND INDUSTRIAL EFFLUENTS BY UPFLOW CLARIFICATION

Denis L. Griffin, Ghar, 8 Park Road, Penarth, Glamorgan, Wales

Filed Feb. 9, 1956, Ser. No. 564,562

6 Claims. (Cl. 210—20)

This invention relates to the purification of liquid sewage and industrial effluents.

Methods of purifying liquid sewage and industrial effluents have comprised causing the liquid to be purified to pass upwards in a sedimentation tank through a blanket formed by a suspension of solid particles. This blanket was, in the known processes, formed with the use of coagulating or flocculating agents and consisted in a suspension of flocculated matter which settled slowly in the tank. The coagulating agents were introduced to the liquid to be treated as it flowed into the tank and the liquid and such agents were mixed in the tank with the use of agitating devices. Alternatively the coagulating agents were mixed with the inflowing liquid to be treated in a separate vessel before the liquid entered the tank or in a mixing zone of the tank before the liquid passed to a sedimentation zone. In order to obtain a marked degree of purification in one tank it has been proposed to retain, in the tank, solids which settled out so as to form as dense a suspension as possible and to introduce a coagulating agent continuously with the inflowing liquid in order to maintain a sufficient density and volume of the suspension. In all the known proposals the blanket was formed by a more or less intimate mixture of the solids to be removed from the liquid undergoing purification and the coagulating agent or agents and, during the process, the flocculated matter was continuously allowed to settle out of the blanket and the blanket was continuously or regularly replenished by the addition of a mixture of the liquid and fresh coagulant.

It is one object of the invention to provide an improved process for the purification of sewage and industrial effluents with the use of flocculating materials which can be carried out for larger periods than hitherto with the same charge of flocculating materials.

It is a further object of the invention to provide an improved process for the purification of sewage with the use of flocculating materials which can be operated economically to give a high degree of purification.

The improved process for the purification of liquid sewage and industrial effluent in liquid form comprises establishing in a sedimentation tank a liquid-permeable blanket of a coherent mass prepared from at least one coagulating agent before the mass is exposed to raw unpurified liquid in movement, introducing raw liquid to the bottom of the tank, causing the raw liquid to flow upwardly in the tank without dispersing the blanket, withdrawing purified liquid from the tank above the blanket and withdrawing sludge from the tank below the blanket.

Further according to the invention the improved process of purifying liquid sewage and industrial effluents in liquid form comprises forming a gelatinous mass from at least one coagulating agent, locating a sufficient quantity of said mass unmixed with raw unpurified liquid in a sedimentation tank to form a coherent liquid-permeable blanket extending across the tank above the bottom thereof, causing raw liquid to flow upwardly from the bottom of the tank below the blanket while maintaining the blanket mass in a coherent state, withdrawing purified liquid from the tank above the blanket and withdrawing sludge from the tank below the blanket.

The mixture may be formed by mixing the coagulating agent or agents in water.

The mass which is used to form the blanket may be prepared from any of the known chemicals commonly used as flocculating agents.

The mass may be introduced in bulk to the tank, after preparation in a separate vessel, in quantities sufficient to form the blanket. The tank to which the mass is introduced in bulk may contain the liquid to be treated but, if present, such liquid is in a quiescent state. Alternatively, the mass may be prepared in an empty, or partly empty, sedimentation tank before the liquid to be purified is introduced.

In contrast to the known processes, the blanket provided in the process according to the invention can be used continuously for long periods without the addition of fresh mass or flocculating agents. It is found in actual tests that the solids which are deposited at the bottom of the sedimentation tank contain only traces of the material which forms the blanket and it is not necessary or desirable to draw off the substance which forms the lower portions of the blanket.

The invention is applicable to the treatment of sewage and industrial effluents which contain suspended solids and/or substances which are present in solution or in a colloidal state and more particularly those which cause a sewage or effluent to have a substantial bio-chemical oxygen demand.

The mass which is to form the blanket may be formed as described in the following examples.

*Example 1.*—Approximately 5 cwts. of aluminium sulphate was dissolved in water at ambient temperature, the water being added until the whole of the aluminium sulphate was dissolved. Approximately 3¾ cwts. of hydrated lime was then placed in a mixing tank provided with suitable stirring mechanism. Water was added and the mixture stirred until the lime was well mixed. The already prepared aluminium sulphate solution was then added and mixed with the lime, stirring being effected continuously while the solution was added to the mixing tank. Stirring was continued until chemical reaction to form aluminium hydroxide was completed, this stage being recognised by the appearance of a thick white gelatinous-like mass. The reaction was usually completed in about twenty minutes.

The pH value of the mass produced was measured and, if necessary, adjusted to a suitable alkaline value by the addition of further lime. The alkalinity of the mass may vary in dependence on the nature of the liquid to be purified and in the case where the liquid was town sewage a suitable pH value was found to be approximately 9 to 10. When a mass having this pH value was used, it was found that putrefaction of the impurities which were removed from the liquid and were deposited in the sedimentation tank was either prevented or substantially reduced. After the process of purification has proceeded for some time any tendency for putrefaction to occur can be checked by adding, at suitable intervals, additional lime directly to the lower part of the tank and this additional lime will also assist in the purification of the effluents. In the tank, to which the mass prepared as described above was introduced, the addition of about ¼ cwt. of lime every other day resulted in a satisfactory condition of the deposited solids being maintained.

The mass formed as described above and having a volume of about 1500 gals. was introduced to an empty sedimentation tank of known construction and having a rectangular cross-section, the lower portion of which had inclined sides so that the cross-sectional area increased from a value of about 4 square feet at the bottom of the tank to a value of about 440 square feet at a level about 16½ feet above the tank bottom. Above this level the tank sides were vertical and extended upwards for about 5½ feet above the inclined sides. An example of such a tank is illustrated diagrammatically in the accompanying drawing in which Fig. 1 is an elevation and
Fig. 2 is a plan view.

Referring to the accompanying drawings, a sedimentation tank having a rectangular cross-section is formed by walls 1 of which the lower portions 1a are inclined and the upper portions 1b are vertical. A channel 2 is formed in the upper wall portions 1b, this channel extending on each side of the tank and opening to a common collecting channel 3. A pipe 4 leads from the channel 3 to filter beds which are not shown. The upper wall portions 1b provide a weir 5 over which purified liquid can flow from the tank into the channel 2. An outlet pipe 6 for the sewage to be purified passes through the upper portion 1b of the tank wall and opens to a vertical pipe 7 which has its lower end disposed near the bottom part of the tank. The top of the pipe 7 is open. A sludge pipe 8 is also disposed in the tank and its lower end located below the bottom end of the vertical pipe 7. This sludge pipe leads to a sludge drain 9 and a valve 10, operable by a hand-wheel 11, is provided to open and close the sludge pipe. An open-ended vertical branch pipe 8a serves to vent the sludge pipe.

A tray 12 formed by suitably supported perforated plates is located in the tank. This tray, as shown, has the shape of an inverted truncated pyramid and has openings of approximately 1/16" width. The lower end of the tray is approximately 9 feet from the bottom of the tank while its upper edge is about 11 feet from the bottom. The vertical pipe 7 is provided with a number of vertically spaced flanges 13 which are provided to prevent the liquid introduced through the lower end of the pipe 7 from flowing upwards in a stream of constricted cross-section and, together with the tray 12 to cause this stream to occupy the full cross-section of the tank.

Figure 2:
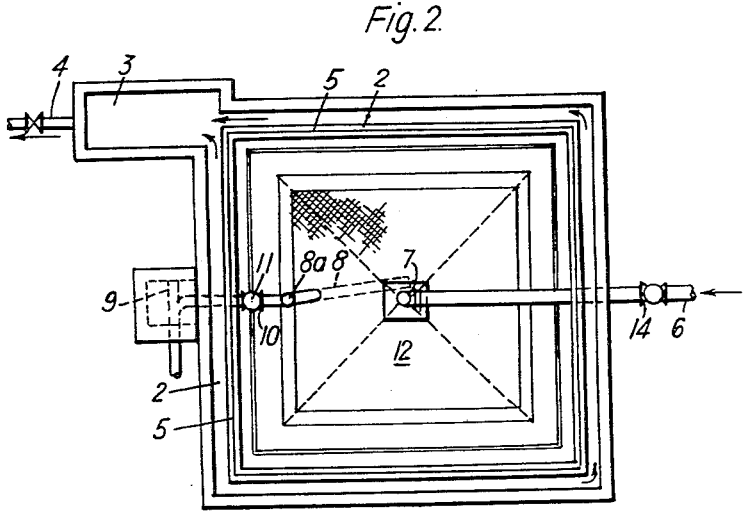

The mass prepared as described above may be first introduced to the tank in any suitable manner and the quantity of 1500 gallons will, after the incoming liquid has been introduced by opening a valve 14 in the inlet pipe 6, form a blanket having a width which is approximately equal to the distance between the levels x—x, and y—y in Fig. 1 when the blanket is at these levels. The position of the blanket will vary in accordance with fluctuations in the rate of upward flow of the liquid to be purified. This rate may have a value of three to four feet per hour but may be as much as five feet per hour and the height of the blanket in the tank is believed to be as indicated by the lines x—x and y—y in Fig. 1 when the upward flow of liquid is four feet per hour. The actual position of the blanket cannot be determined precisely but the rate of upward flow of the liquid to be purified is so arranged that the blanket is suspended above the bottom of the tank.

The lime which may periodically be added, for example every other day, as described above, is introduced directly to the bottom of the tank preferably by a removable pipe which is not shown. From time to time, and depending on the quantity of the material forming the blanket which is removed with the sludge and also on the length of time during which the blanket has been in use, fresh amounts of blanket material prepared as described above from flocculating agents, may be introduced to the blanket, preferably into the top thereof, by a removable pipe which also is not shown.

Removal of sludge via the pipe 8 is effected at intervals when necessary by opening the valve 10. The times at which this sludge removal is effected depends on the rate of settlement of sludge in the tank and may be found by trial in each case. The valve 10 is kept open as long as sludge appears in the sludge drain.

The mass which is used to form the blanket may be prepared as in the following example and employed in the tank illustrated in the drawings for the treatment of town sewage.

*Example 2.*—Approximately 5 cwts. of aluminium sulphate solution was prepared as described in Example 1 directly in a mixing tank. About 6⅔ cwts. of sodium aluminate was then added to the tank and the mixture thoroughly stirred until normal reaction was complete and aluminium hydroxide was formed as a gelatinous mass. The mass was then added to the tank as described with reference to the mass prepared as in Example 1. The pH value is adjusted, if necessary, to a suitable alkaline value by adding aluminium sulphate or sodium aluminate as the case may be.

Experiment has indicated that a blanket formed and used as described above may be used for periods of some weeks without the addition of fresh mass to replenish the blanket.

I claim:

1. The process of purifying liquid sewage and industrial effluents in liquid form which comprises establishing in a sedimentation tank a liquid-permeable blanket of a coherent mass prepared from at least one coagulating agent before the mass is exposed to raw unpurified liquid in movement, introducing raw liquid to the bottom of the tank, causing the raw liquid to flow upwardly in the tank without dispersing the blanket, withdrawing purified liquid from the tank above the blanket and withdrawing sludge from the tank below the blanket.

2. The process of purifying liquid sewage and industrial effluents in liquid form which comprises forming a gelatinous mass from at least one coagulating agent, locating a sufficient quantity of said mass unmixed with raw unpurified liquid in a sedimentation tank to form a coherent liquid-permeable blanket extending across the tank above the bottom thereof, causing raw liquid to flow upwardly from the bottom of the tank below the blanket while maintaining the blanket mass in a coherent state, withdrawing purified liquid from the tank above the blanket and withdrawing sludge from the tank below the blanket.

3. The process according to claim 2 wherein the mass is formed by mixing at least one coagulating agent with water.

4. The process of purifying liquid sewage and industrial effluents in liquid form which comprises establishing in a sedimentation tank before raw liquid commences to flow therein a liquid permeable blanket formed of gelatinous aluminium hydroxide, introducing raw liquid to the bottom of the tank, causing the raw liquid to flow upwardly in the tank without disturbing the blanket, withdrawing purified liquid from the tank above the blanket and withdrawing sludge from the tank below the blanket.

5. The process as claimed in claim 2 wherein the mass comprises a reaction product of aluminium sulphate and hydrated lime.

6. The process as claimed in claim 2 wherein the mass comprises a reaction product of aluminium sulphate and sodium aluminate.

References Cited in the file of this patent

UNITED STATES PATENTS

| | | |
|---|---|---|
| 275,277 | Seiler | Apr. 3, 1883 |
| 344,740 | Howatson | June 29, 1886 |
| 653,011 | Koyl | July 3, 1900 |
| 1,199,099 | Münzer | Sept. 26, 1916 |
| 1,745,657 | Beckmann | Feb. 4, 1930 |

(Other references on following page)

UNITED STATES PATENTS

| | | |
|---|---|---|
| 1,847,221 | Morgen | Mar. 1, 1932 |
| 2,272,026 | Spaulding | Feb. 3, 1942 |
| 2,347,318 | Gurney | Apr. 25, 1944 |
| 2,382,490 | Lawlor | Aug. 14, 1945 |
| 2,401,924 | Goetz | June 11, 1946 |
| 2,422,258 | Prager | June 17, 1947 |
| 2,613,181 | Green et al. | Oct. 7, 1952 |
| 2,676,919 | Pirnie | Apr. 27, 1954 |
| 2,723,231 | Logan et al. | Nov. 8, 1955 |